United States Patent
Rotan et al.

(10) Patent No.: US 6,920,938 B1
(45) Date of Patent: Jul. 26, 2005

(54) ERGONOMIC ROCKING EARTH HOLE PUNCH

(76) Inventors: Amy Christine Rotan, 23 Flesher, Ellisville, MO (US) 63011; Thomas Joseph Silberberg, 23 Flesher, Ellisville, MO (US) 63011

(*) Notice: Subject to any disclaimer, the term of this patent is extended or adjusted under 35 U.S.C. 154(b) by 0 days.

(21) Appl. No.: 10/755,898

(22) Filed: Jan. 13, 2004

(51) Int. Cl.[7] ............................................. A01B 45/02
(52) U.S. Cl. ........................................................ 172/21
(58) Field of Search .......................... 172/21, 22, 371, 172/378, 41

(56) References Cited

U.S. PATENT DOCUMENTS

| | | | |
|---|---|---|---|
| 2,069,958 A | * | 2/1937 | Diemer Kool ............ 56/400.16 |
| 2,910,127 A | * | 10/1959 | Saunders ..................... 172/21 |
| 5,813,471 A | * | 9/1998 | Ramsey ....................... 172/21 |
| 6,631,770 B2 | * | 10/2003 | Guard et al. ................. 172/21 |

* cited by examiner

*Primary Examiner*—Robert E Pezzuto

(57) ABSTRACT

An ergonomically designed earth perforating tool consisting of a rectangular top plane and a convexly bowed base from which protrudes a plurality of spikes or times. A length of strap or rope is attached to each short end of the rocking plane to assist user balance. When stood upon and rocked side to side the spikes on the underside of tool easily penetrate the earth and hundreds of small holes are made at one time for aeration purposes or for the introduction of seed, fertilizer, herbicides, or any other matter. The user's centered body weight enables maximum use of centrifugal force effectively eliminating most of the physical strain associated with manual earth perforation and puncturing tools.

9 Claims, 2 Drawing Sheets

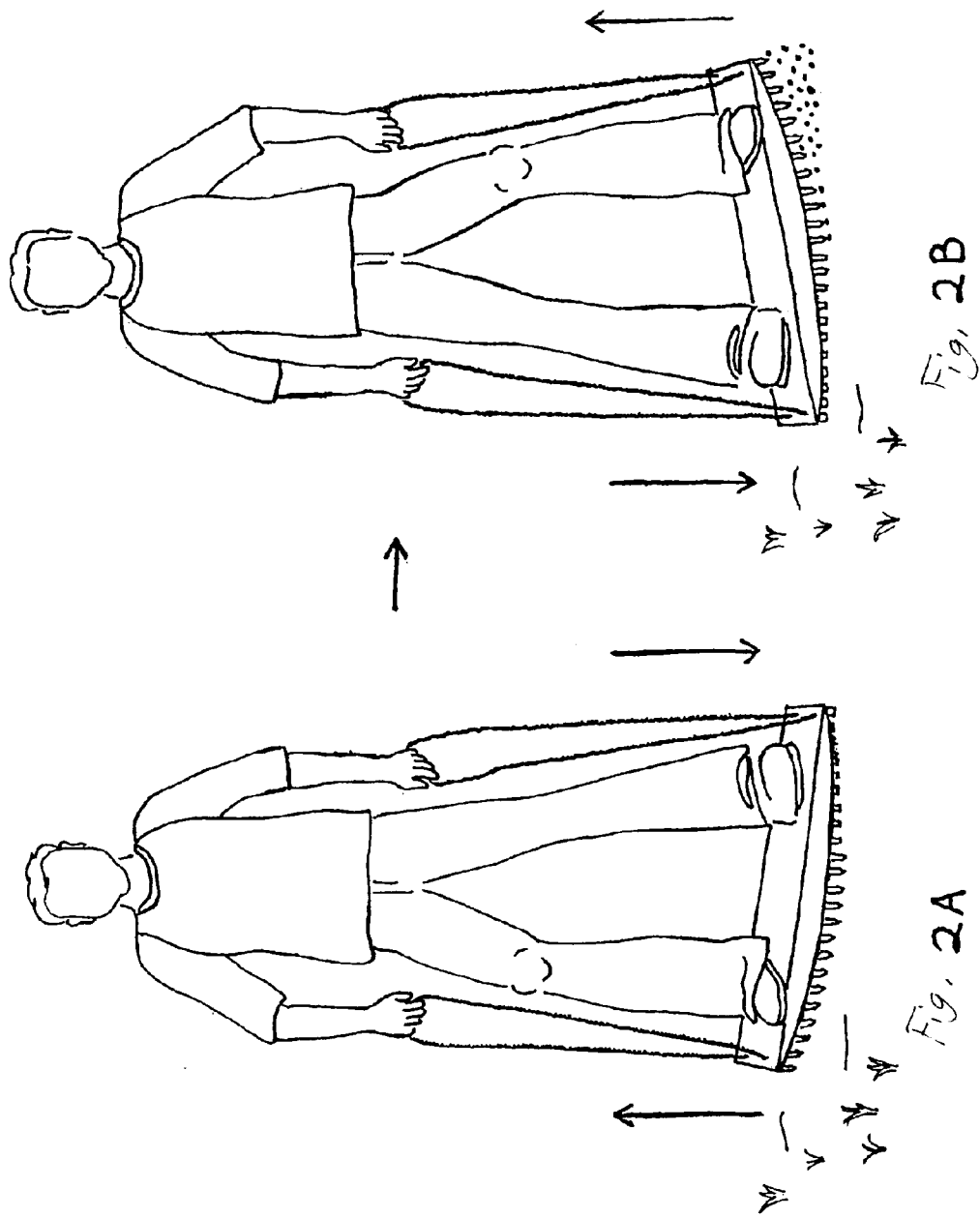

ERGONOMIC ROCKING EARTH HOLE PUNCH

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention relates generally to lawn and garden tools and more particularly to those tools used for manually perforating the earth for aeration purposes or in preparation for introduction of seed, fertilizer, herbicides, pesticides and other matter.

It is well known to the art that perforating the earth dramatically increases the success of seeding, hydrating and adding nutrients to soil, and weeding and pest control when granular substances are used.

Spot lawn and garden perforation is well known in the art as a physically demanding and time consuming task when performed with manual tools that require physical force to puncture the earth such as rakes, hand augers, spiked or tined implements and even improvisational tools such as screwdrivers or picks.

Tools in the art specifically for lawn aeration include footwear attachments such as with U.S. Pat. No. 4,035,935 requires the user to be able to strap apparatus to their footwear and walk or stomp on the area to be aerated. There are also many dual use tools which can be used for aeration purposes such as U.S. Pat. No. 6,427,613 which requires the user to physically force the boring mechanism into the earth and can only create a minimal amount of holes at one time. A number of aeration devices are available that attach to larger machinery and are designed for larger agricultural purposes.

The following previously filed applications are referenced as they pertain to turf aeration and planting tools U.S. Pat. Nos. 5,228,400, 5,555,943, 6,223,456, and 6,467,551. However, these patents, as well as the patents above, are not believed to be pertinent to the patentability of the present application and are provided merely for an understanding of the background and deficiencies of the prior art.

Most of the current inventions available for spot lawn aeration and soil preparation for introduction of matter require physical force from the user and some have complicated moving mechanical parts that become clogged with use. Prior inventions also require physical strain of the user when the implements get stuck in the earth and have to be dislodged by pushing, pulling and yanking motions.

There is a great usefulness for a soil aeration and perforation device that is simple, effective and can be used even by persons of limited physical capacity.

BRIEF SUMMARY OF THE INVENTION

The invention is a one piece rocking ground perforation tool that punches hundreds of small holes in the earth with one gentle side to side rocking motion to aerate or prepare soil for introduction of matter.

The novelty of the invention over all prior art is that it is an aerating and ground preparation tool of one piece construction that is significantly more effective and simple and that it is light weight and can be used even by physically challenged individuals.

The invention virtually eliminates the need for physical force and repetitive motions associated with other tools of the art.

The invention operates with the centered body weight of the user coupled with centrifugal force which virtually eliminates the danger of over exertion or repetitive motion injuries which can be associated with other tools of the art. An additional problem solved by the invention is that it can not get stuck in the earth like prior inventions requiring excessive physical strain to dislodge the implements. The spikes of the invention are easily dislodged from the earth simply by applying minimal pressure on one side of the rocking plane of the invention.

The invention eliminates the need for expensive purchase or rental of aerating and perforation machines for small to medium sized aeration or perforation jobs. The invention can be operated by standing, sitting, kneeling or even laying upon the top plane of the invention and rocking from side to side making it usable even for handicapped individuals such as paraplegics and amputees. All that is required of the user to be able to successfully use the invention is that they be somewhat mobile and have a means of transporting the invention to the site of operation. The invention will be light weight and when flipped onto it's flat top surface can easily be dragged to the sight of operation further facilitating use by those of limited physical capacity.

BRIEF DESCRIPTION OF THE SEVERAL VIEWS OF THE DRAWING

In the drawings wherein like reference numerals and letters represent like parts:

FIGS. 2A and 2B illustrate the Ergonomic Rocking Earth Hole Punch in use.

DETAILED DESCRIPTION OF THE INVENTION

The Ergonomic Rocking Earth Hole Punch will herein be referred to as said tool: Although the body of our working proto type of said tool is constructed of half inch plywood, sections of sharpened wood dowels and screws, the desirable construction for manufacture would be of injection molded plastic.

Figure 1A:
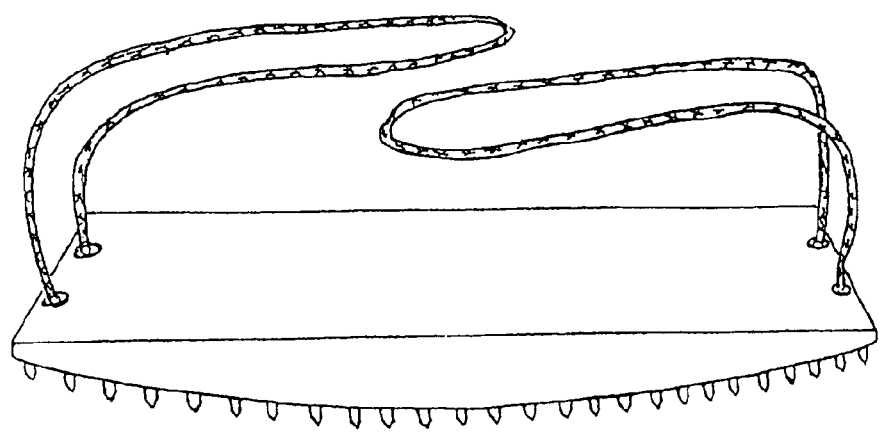
FIG. 1A is a top perspective view of an Ergonomic Rocking Earth Hole Punch and the strap or rope handles attached.
Figure 1C:
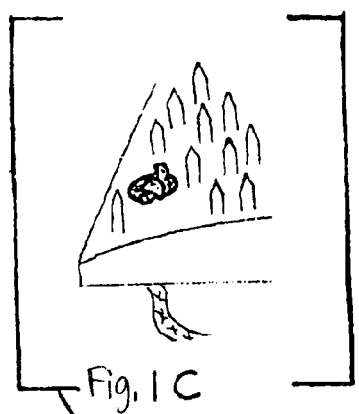
FIG. 1C is an exploded view of the counter sunk hole that accommodates the knot of the balancing strap of the Ergonomic Rocking Earth Hole Punch.
Figure 1B:
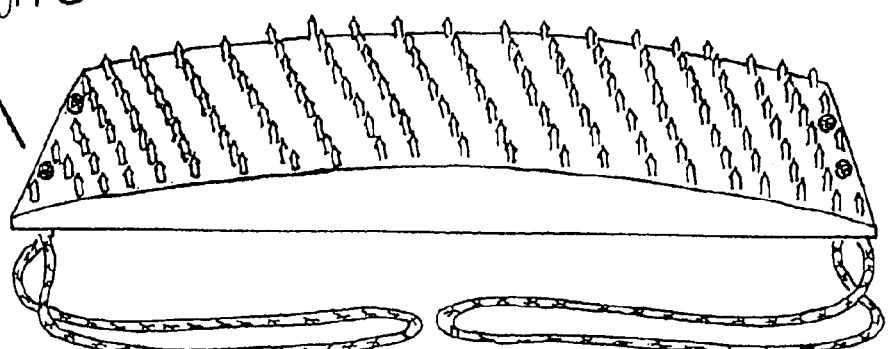
FIG. 1B is a view of the bottom side of An Ergonomic Rocking Earth Hole Punch when flipped over.

The body of said tool would be one piece as seen in FIGS. 1A and 1B of drawings preferably with a hollow core but could also be of solid hard plastic or resin.

Said tool would have a top rectangular plane measuring approximately fourteen inches by thirty two inches, two side planes extending vertically from short sides of top plane measuring approximately fourteen inches by one inch, two side planes extending vertically from long ends of top plane having a straight edge at the top and being approximately one inch in height at the outer most edges and approximately two and one half inches at their center creating an arced bottom edge on both sides. The convex bottom of said tool is approximately fourteen inches by thirty two and one half inches and is bowed upwards to join all four sides. The thickness of all walls would be approximately one half inch if said tool is manufactured of injection molded plastic. The convex bottom wall of said tool has approximately two hundred and ten spikes imbedded in and protruding vertically and measuring approximately one and one quarter inch in vertical length from their base. The spikes of said tool are approximately three eighth inches in width and have a circumference of approximately one and two eighths inches at their base and graduate vertically to a point.

Said tool will have a length of strap or rope of appropriate composition attached to the ends of rocking plane as seen in FIGS. 1A and 1B of the drawings and will extend upwardly from the top plane to be grasped as a means of balance for the user while operating said tool in an upright standing position. The holes in said tool for threading a length of strap or rope will have a counter sunk cavity to accommodate a knot as seen in FIG. 1C of drawings to secure the strap or rope to said tool without inhibiting the depth capabilities of the spikes in the area of the knot.

Initial set-up for manufacturing said tool using mold injection technology would require the machining of a mold which can be costly. Once the initial set up costs are paid for, said tool could be extremely inexpensive to manufacture in large quantities as it has no moving parts, would not require assembly and would require only approximately three to six pounds of plastic to produce each piece. We believe said tool would be very desirable especially to those who spend an exorbitant amount of time and energy seeding and re-seeding the same patches of their lawn or have no inexpensive non-physically demanding way to aerate. As stated in the claim and summary of invention, said tool is a device for creating multiple perforations in the earth in preparation for introducing matter including but not limited to seed, fertilizers, herbicides and pesticides and for general aeration.

Said tool works best in dry to moderately moist soil. When said tool is used in overly moist soil it tends to start caking between spikes. The soil cakes much less with said tool than with previous tools of the art and one would not even consider using previous tools of the art in dry soil in which said tool works great.

Said tool is simple to operate as seen in FIGS. 2A and 2B of drawings. The user simply sets said tool on section of earth to be perforated, steps onto said tool with feet placed close to the outer short edges of top plane and rocks side to side causing the spikes to penetrate the earth and displace soil leaving hundreds of small holes in the surface.

Said tool can also be operated from a kneeling, sitting or even laying down position. The weight of the user balanced directly on top of the tool and centered provides maximum use of centrifugal force which enables the desired effect with virtually none of the physical exertion required of other tools of the art.

Other inventions in the art have handles atop poles with foot rests atop the boring implements which restrict the user from using their full weight from a central position for sinking power. Said tool allows the user not only to use their full weight from a central position above the tool but also allows the advantage of the centrifugal force created by the rocking motion making execution of the desired effect almost effortless.

As said tool relates to preparation for seeding, especially grass, significantly less seed is lost to foot traffic, wind and water run-off with use of said tool as opposed to surface seeding only.

Although the preferred method and material for construction of said tool would be of one piece injection molded plastic the said tool may also be constructed of modular parts including but not limited to wood, welding, metal molding, chemical bonding, nuts, bolts, screws, rivets, nails and other fasteners and materials. While said tool has been described in it's most preferred embodiment, we do not wish to be limited thereto, obvious modifications may occur to those skilled in the art without departing from the spirit or nature of the invention.

We claim:

1. An ergonomic lawn or garden tool for creating a plurality of perforations or holes in the earth comprising:

a body consisting of a rectangular plane set upon an opposite convexly arced base from which protrudes a plurality of tines outwardly from said arced base.

2. The ergonomic tool of claim 1 further comprising a length of strap or rope attached to opposite ends of said body as a hand held means of balance.

3. A tool for loosening hardened earth comprising:

a base portion having a profile generally corresponding to a segment of an ellipse, an arcuate portion of the segment of the ellipse further comprising a plurality of tines extending outwardly therefrom.

4. The tool of claim 3 wherein the segment of an eclipse profile is in the shape of a segment of a circle.

5. The tool of claim 3 wherein the base portion further defines a bore extending through the base portion generally perpendicularly to a planar portion of the segment of an ellipse and wherein a length of rope extends through the bore to attach to the base portion.

6. A tool for loosening hardened earth comprising:

a base comprising a generally arcuate side and an opposite, generally planar side; and a plurality of lines extending outwardly from the generally arcuate side such that when a person stands on the generally planar side with the arcuate side placed on the earth, the earth is loosened and broken up by the tines when the person on the generally planar side rocks the tool back and forth upon its planar side.

7. The tool of claim 6 wherein the generally arcuate side has a profile in the form of a segment of an ellipse.

8. The tool of claim 6 wherein the generally arcuate side has a profile in the form of a segment of a circle.

9. The tool of claim 6 wherein the base further defines a bore extending through the base generally perpendicularly to the planar side of the base and wherein a length of rope extends through the bore to attach to the base.

* * * * *

UNITED STATES PATENT AND TRADEMARK OFFICE
CERTIFICATE OF CORRECTION

PATENT NO. : 6,920,938 B1 Page 1 of 1
DATED : July 26, 2005
INVENTOR(S) : Amy Christine Rotan and Joseph Silberberg It is certified that error appears in the above-identified patent and that said Letters Patent is hereby corrected as shown below:

Column 1,
Line 53, replace "dogged" with -- clogged --.

Column 4,
Line 45, replace "lines" with -- tines --.

Signed and Sealed this

Eighteenth Day of October, 2005

JON W. DUDAS
*Director of the United States Patent and Trademark Office*